(12) United States Patent
Gau et al.

(10) Patent No.: US 10,834,025 B2
(45) Date of Patent: *Nov. 10, 2020

(54) MULTI-FUNCTIONAL INTEGRATED COMMUNICATIONS SYSTEM APPLICATION

(71) Applicant: AMERICAN INNOVATIVE APPLICATIONS CORPORATION, Clarksville, VA (US)

(72) Inventors: Shane Gau, Clarksville, VA (US); James Moody, Clarksville, VA (US)

(73) Assignee: American Innovative Applications Corporation, Clarksville, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/429,973

(22) Filed: Jun. 3, 2019

(65) Prior Publication Data

US 2019/0334841 A1    Oct. 31, 2019

Related U.S. Application Data

(63) Continuation of application No. 15/654,158, filed on Jul. 19, 2017, now Pat. No. 10,320,716.

(60) Provisional application No. 62/364,166, filed on Jul. 19, 2016.

(51) Int. Cl.
    *G06F 15/16*    (2006.01)
    *H04L 12/58*    (2006.01)
    (Continued)

(52) U.S. Cl.
    CPC .............. *H04L 51/02* (2013.01); *G06F 9/453* (2018.02); *G06F 16/9535* (2019.01);
    (Continued)

(58) Field of Classification Search
    USPC ....... 709/203, 206, 217, 219, 223, 224, 226, 709/228, 230, 232, 238; 726/7
    See application file for complete search history.

(56) References Cited

U.S. PATENT DOCUMENTS 10,320,716 B2    6/2019  Gau et al.
2003/0216981 A1  11/2003 Tillman
(Continued)

OTHER PUBLICATIONS

International Search Report and Written Opinion of the International Searching Authority, dated Sep. 28, 2017 in corresponding International Application No. PCT/17/42690, 9 pages.

*Primary Examiner* — Quang N Nguyen
(74) *Attorney, Agent, or Firm* — Foley & Lardner LLP

(57) ABSTRACT

Disclosed herein is an integrated communications system application (ICSA) employed in conjunction with a suitable chat application (executed by a bot) for delivering an automated customer service support for businesses. ICSA herein may include an information storage system, a communication platform, and a facility system mutually sharing information and registering said information in web servers. A bot, connected to ICSA via web servers, may interact with a user employing channels such as chat applications, and may connect to said user via a bot connector. A user may not need to download any additional application to interact with bot herein and receive an automated customer service for different types of businesses.

16 Claims, 7 Drawing Sheets

(51) Int. Cl.
  *G06F 16/9535* (2019.01)
  *G06F 9/451* (2018.01)
  *G06Q 30/00* (2012.01)
  G06Q 10/10 (2012.01)
  G06Q 30/02 (2012.01)
  G06Q 30/06 (2012.01)

(52) U.S. Cl.
  CPC ........... *G06Q 30/016* (2013.01); *G06Q 10/10* (2013.01); *G06Q 30/0269* (2013.01); *G06Q 30/0617* (2013.01)

(56) References Cited

U.S. PATENT DOCUMENTS

| | | |
|---|---|---|
| 2005/0044409 A1 | 2/2005 | Betz et al. |
| 2008/0147514 A1 | 6/2008 | Shuster et al. |
| 2011/0054955 A1 | 3/2011 | Nasrallah |
| 2011/0225100 A1 | 9/2011 | Sangal et al. |
| 2012/0204032 A1 | 8/2012 | Wilkins et al. |
| 2014/0122247 A1 | 5/2014 | Harvey et al. |
| 2016/0180048 A1* | 6/2016 | Lin ............... G06F 19/3418 726/7 |
| 2017/0180276 A1 | 6/2017 | Gershony et al. |
| 2018/0068132 A1* | 3/2018 | Zubair ............... G06F 21/44 |
| 2018/0083898 A1 | 3/2018 | Pham |
| 2018/0367483 A1 | 12/2018 | Rodriguez et al. |
| 2019/0197217 A1* | 6/2019 | Donovan ............ G06F 11/3476 |
| 2019/0377900 A1* | 12/2019 | Balzer ................ G06F 21/6254 |
| 2020/0007579 A1* | 1/2020 | Barday .............. G06F 21/6245 |

\* cited by examiner

MULTI-FUNCTIONAL INTEGRATED COMMUNICATIONS SYSTEM APPLICATION

CROSS-REFERENCE TO RELATED APPLICATIONS

This application is a continuation application of U.S. application Ser. No. 15/654,158, filed Jul. 19, 2017, which claims priority to U.S. Provisional Patent Application Ser. No. 62/364,166, filed Jul. 19, 2016, which are hereby incorporated by reference in their entirety.

TECHNICAL FIELD

The present invention generally relates to communication systems and more specifically to a multi-functional integrated communications system application for enhancing communication between customers and a facility management through use of automated agents.

BACKGROUND

Conventionally, to increase business efficiency and customer satisfaction, some businesses may utilize an automated conversation agent, or bot, implemented by a computer program with a suitable, in many cases purpose built backend. Typically, these bots perform tasks that are both simple and structurally repetitive at a much higher rate than would be possible for a human alone. However, these bots do not always provide the best experience to a potential customer, presenting numerous limitations to available tasks, and repeatedly needing human support engagement. This results in preventing the human agent from engaging in other business tasks.

Many restaurants are developing individual smartphone applications which allow a user to engage with a particular restaurant location. However, it is undesirable to download a smartphone app for each of what could be dozens or possibly hundreds of individual restaurants. To solve this, other applications have been developed which allow for specific actions to be taken, such as finding a restaurant, making a reservation, or reviewing a restaurant. However, these restaurant apps often request users to provide personally identifiable information (PII) such as phone number, or the users can interact directly with restaurants in only the most basic of ways, increasing inconvenience for users. Therefore, there is a growing need for improvement of communication systems between consumers and businesses for increasing customer satisfaction and operations efficiency.

SUMMARY

The current disclosure describes an integrated communications system application (ICSA) that may be employed in order to deliver an automated customer support for increasing service efficiency, providing an enhanced customer experience for different types of business interactions. According to certain embodiments, said ICSA may be utilized in conjunction with a suitable chat application in order to perform different customer support functions. Suitable chat applications may include Facebook Messenger™, Slack™, Skype™, Kik™, and WhatsApp™ among others.

In an embodiment, an integrated communications system application comprises a data store configured to store data records containing information about a plurality of facilities and data records containing information about a plurality of users, wherein the information about the plurality of users comprises personally identifiable information; an application server configured to transmit and receive information with the data store, the application server comprising a bot configured to communicate between a user of the plurality of users and a facility of the plurality of facilities by receiving, via a facility customer application executed on a computing device of a user during a session on a channel on a communication platform, a user request of the user, wherein the facility customer application is configured to receive user requests from the user computing device and transmit the user request to at least one of the bot of the application server and the facility management application; transmitting, via the channel on the communication platform, the user request to a facility computing system of a facility of the plurality of facilities, and transmitting, from the facility computing system of the facility during the session on the channel on the communication platform, to the computing device of the user, a message corresponding to the user request; and a bot connector configured to route messages between the bot of the application server and the computing device of the user via the channel of the communication platform; and the facility management application configured to receive and transmit information about the user and the user request, from the facility customer application via the bot during the session, without any personally identifiable information of that user, update information about the facility in the data store, and receive and transmit information about the user and the user request from the facility customer application without communicating via the bot during the session; the communication platform containing at least one channel configured to receive, from the facility customer application, the user requests and route the user request to the bot of the application server via the bot connector, receive, from the facility computing system, the message corresponding to the user request; and the facility computing system associated with the facility, the facility computing system comprising a user interface of the facility management application on a facility computing device, wherein the user interface is configured to receive data associated with the facility.

In another embodiment, a computer implemented method comprises receiving, by a server, via a facility customer application executed on a computing device of a user during a session on a channel on a communication platform, a user request from the user, wherein the facility customer application is configured to receive user requests from the user computing device and transmit the user request to at least one of a bot of the server and a facility management application, wherein the user request comprises personally identifiable information, and wherein the communication platform is configured to receive, from the facility customer application, the user requests and route the user request to a bot of the server via a bot connector, and receive, from a facility computing system, a message corresponding to the user request, the facility computing system comprising a user interface of the facility management application on a facility computing device, wherein the user interface is configured to receive data associated with the facility; and transmitting, by the server, via the channel on the communication platform, the user request to the facility computing system of the facility; transmitting, by the server, from the facility computing system of the facility during the session on the channel on the communication platform, to the computing device of the user, the message corresponding to the user request; updating, by the server, a plurality of data records within a data store configured to store the plurality of data records containing information about a plurality of facilities and data records containing information about a plurality of users, wherein the information about the plurality of users comprises personally identifiable information, wherein the server updates the plurality of data records based on the user request and the message corresponding to the user request.

Integration with suitable chat applications make ICSA described herein a convenient and viable option over alternatives requiring a user to download a specific application of the facility or location delivering a required service. Additionally, unlike other alternatives, the ICSA does not need a user to provide personally identifiable information (PII) such as phone number to a facility or location.

According to an embodiment, the architecture of ICSA may include an information storage system, a communication platform, and a facility system. The information storage system may allow for a facility manager to input facility information into a data store connected to a content management application (CMA). Information from the CMA may be shared with an ICSA manager, application server, and a cloud system. This information may also be shared with a communication platform including an SMS provider, an in-application notification provider, and a suitable chat engine. This communication platform may share information with a facility system including a facility customer application (FCA), a facility management application (FMA), and a facility server screen (FSS). Real-time updates may be available between facility system and information storage system, allowing a user, a service provider, and an operations manager to mutually access this information. Additionally, real-time chats may allow for communication between a user, service provider, and/or operations manager.

According to an embodiment, ICSA of the current disclosure may include a bot connected to channels via a bot connector. The bot may include a bot web service that allows integration and communication with ICSA, and the bot connector may include different functions including route messaging, messages state, bot registration, directory session tracking services (translation), per-user and per-bot storage, software kit development (SDK), and application programming interfaces (APIs).

According to an embodiment, an FCA of the current disclosure may include a client with a web browser, mobile devices, a suitable chat application, and a website plugin. The client is connected to a web server and is served presentation/user interface (UI) layer components and UI process components. Presentation/UI layer may employ a caching system to load certain UI assets into memcache to reduce load times. Mobile devices, chat application, website plugin, and external resources, if existent, may communicate with ICSA platform application programming interfaces (APIs), which may be used to perform CRUD (create, read, update, delete) operations for ICSA. The web server may additionally include cross cutting functions such as security, operational management, and communication. Additionally, a business function layer may be used to hold business logic and rules, and may include application facade, business workflow, business components, and business entities. Finally, a data layer may include data access components, data helpers/utilities, and service agents. The data layer may hold data per application, communicate with service features, and sync data between a database server which may include FCA and CMA databases.

According to an embodiment, an FMA of the current disclosure may include a client with a web browser and mobile devices. The client is connected to a web server and is served presentation/UI layer components and UI process components. Presentation/UI layer may employ a caching system to load certain UI assets into memcache to reduce load times. Mobile devices and external resources, if existent, may communicate with ICSA platform APIs, which may be used to perform CRUD operations for ICSA. The web server may additionally include cross cutting functions such as security, operational management, and communication. Additionally, a business function layer may be used to hold business logic and rules, and may include application facade, business workflow, business components, and business entities. Finally, a data layer may include data access components, data helpers/utilities, and service agents. The data layer may hold data per application, communicate with service features, and sync data between a database server which may include FCA and CMA databases.

According to an embodiment, a CMA of the current disclosure may include a client with a web browser. The client is connected to a web server and is served presentation/UI layer components and UI process components. Presentation/UI layer may employ a caching system to load certain UI assets into memcache to reduce load times. The web server may additionally include cross cutting functions such as security, operational management, and communication. Additionally, a business function layer may be used to hold business logic and rules, and may include application facade, business workflow, business components, and business entities. Finally, a data layer may include data access components, data helpers/utilities, and service agents. The data layer may hold data per application, communicate with service features, and sync data between a database server which may include FCA and CMA databases.

According to an embodiment, elements in architecture of ICSA may be modified or replaced depending on desired application. For example, in an embodiment of ICSA being employed in a restaurant, it may be possible to replace an FCA by a restaurant guest application (RGA); an FMA by a restaurant management application (RMA); an FSS by a kitchen server screen (KSS); a facility manager by a restaurant manager; a service provider by a host; and an operations manager by a kitchen manager.

According to an embodiment, ICSA described herein may be employed to provide an automated customer service for a restaurant. Yet further in this embodiment, using a chat application, an automated customer support process for a restaurant may allow a user to start a restaurant bot and be provided an option for getting recommendations for restaurants by specifying one or more of a food type, budget, and location. A user may also get an option for not getting recommendations and directly specifying a location of a desired restaurant. Said location may be specified taking as reference current location of a user or by inputting a given location including on ore more of city, zip code, or state, amongst others. Displayed restaurants may be shown in order relevant to current location of a user. After selecting a desired restaurant, a user may check restaurant details including menu and wait time. If a user wants to pre-order food from the restaurant menu without making a line or reservation, the user may get an option to pre-order by calling the restaurant, or to pre-order through the chat application. A user may afterwards be provided with an option to get delivery, in which case the user may need to specify desired location. Otherwise, the user may have to physically go to the restaurant to wait to be seated and receive the order to eat in, or pick up the order to go.

Continuing with the automated customer support process, a user may have an option to get in line of a restaurant, being prompted to provide information such as party size and special requests. Once in line, a user gets options that may include: leaving a line of a restaurant; moving back one or more spots in line; bidding on a line spot; and pre-ordering food and drinks and paying through an integrated payment method included in ICSA. If a user decides to leave the line, the user may also get the option to put the spot for sale. If a user finds a suitable buyer for the spot, he may swap the spot with the buyer, or may just fall out of line. Users may also get an option to share through a suitable medium (e.g. social media) the fact that they have gotten in line. A user may also receive notifications that a restaurant frequented in the past has started a wait line, and may be able to get in that wait line if desired.

Going back to options after selecting a desired restaurant, a user is able to make a reservation, which may require specifying a reservation party size as well as date and time of reservation. A user may also get an option to modify, cancel, buy, and sell one or more reservations. After selecting a desired restaurant, a user may also get an option to get directions and request a ride to the restaurant to finally be seated at the restaurant when suitable time comes.

At any step of the automated customer support described herein there may be an option for human support engagement allowing for real-time chats between a user with a host and/or a kitchen manager.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have particular advantages not specifically recited in the above summary. Other features and advantages of the present invention will be apparent from the accompanying drawings and from the detailed description that follows below.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, numerous specific details are set forth. However, it is understood that embodiments of the invention may be practiced without these specific details. In other instances, well-known circuits, structures, and techniques have not been shown in detail in order not to obscure the understanding of this description.

In the following description, reference is made to the accompanying drawings, which illustrate several embodiments of the present invention. It is understood that other embodiments may be utilized, and mechanical compositional, structural, electrical, and operational changes may be made without departing from the spirit and scope of the present disclosure. The following detailed description is not to be taken in a limiting sense, and the scope of the embodiments of the present invention is defined only by the claims of the issued patent.

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1:
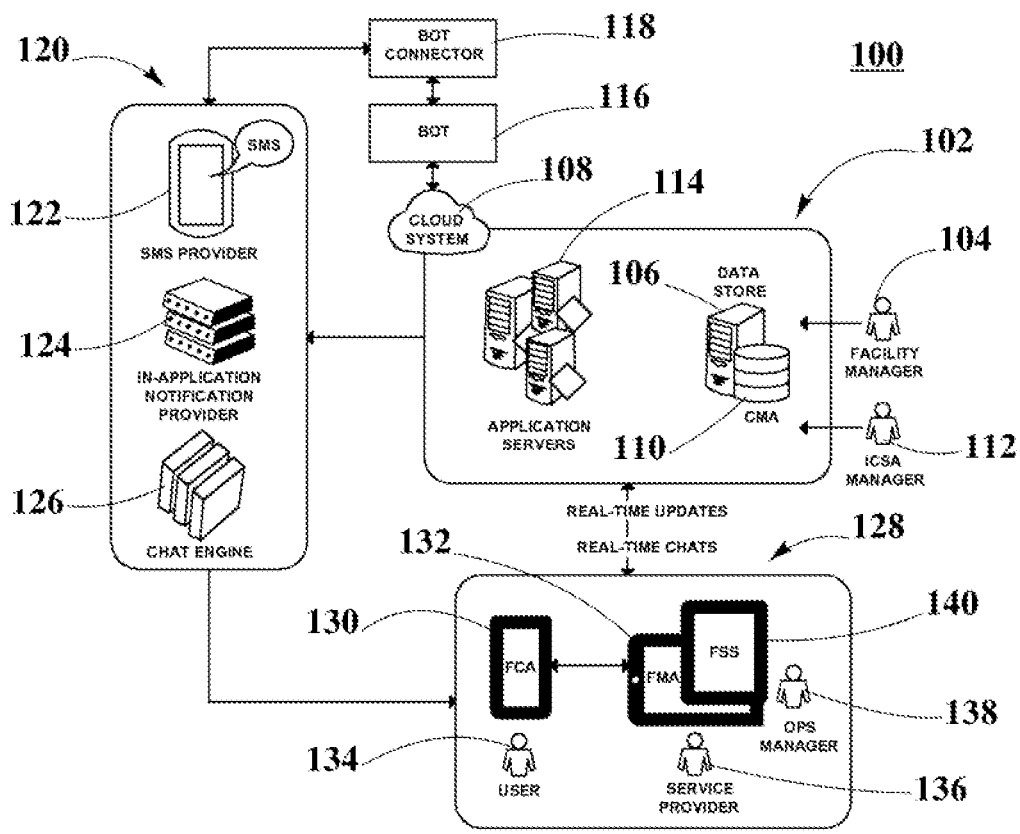
FIG. 1 illustrates an architectural diagram of an integrated communications system application (ICSA), according to an embodiment.

FIG. 1 illustrates an architectural diagram of ICSA 100, according to an embodiment. An information storage system 102 may be a host entity that is configured to communicatively couple a plurality of facilities, a plurality of users, and a communication platform. The information storage system 102 is configured to allow a facility manager 104 to maintain facility information in a data store 106. In one example, the data store 106 may be configured as at least one solid state drive that stores the most frequently used data and a hard disk drive that stores less frequently used data. The data store 106 may store information about each facility in a plurality of data records, whereby inputs from the facility manager 104 will update the data records accordingly. The information storage system 102 may also store information in a cloud system 108, which may include or be separate from the data store 106. Information in the data store 106 includes user information and contains PII of those users, but also associates the users with an identifier such that information about the users can be distributed to other components of the ICSA 100 without sharing the PII.

The data store 106 is connected to a content management application (CMA) 110. The CMA 110 is a user interface configured to allow editing, adding, and deleting content from the data records in the data store 106. An ICSA manager 112 may access the CMA 110 to edit information in the data store 106. Additionally, the CMA 110 may be configured to allow information from the data records of the data store 106 to be transmitted to application servers 114.

The application servers 114 are depicted as a plurality of servers but may be configured as a single server. The application servers 114 store and execute a bot 116 that is communicatively coupled to a bot connector 118 executing on a communication platform 120.

The communication platform 120 is communicatively coupled to the information storage system 102. The communication platform 120 may execute an application configured to allow a text-based or voice-based communication via a computing device to another user, e.g., a chat application, a text message application native to an operating system, or a text message application hosted by a social networking platform. For example, the communication platform 120 may include an SMS provider 122, an in-application notification provider 124, and/or a chat engine 126.

Communication platform 120 and the information storage system 102 are communicatively coupled to a facility system 128 for each facility. The facility system 128 may include a facility customer application (FCA) 130 for each user and a facility management application (FMA) 132 for each of the plurality of facilities. The application servers 114 host the application executed by the FCA 130 and FMA 132.

The FCA 130 is an application that has a user interface configured for a computing device of a user 134 to input requests for the facility (e.g., reservation, food order). Most requests from FCA 130 will be communicated via communication platform 120. The application server 114 receives information from the communication platform 120 and transmits appropriate information to the FMA 132. In some instances, the FCA 130 may communicate directly with the FMA 132. For example, the user 134 may interact with FCA 130 to conduct a real-time chat with a service provider 136 or an operations (OPS) manager 138 of FMA 132.

FMA 132 is an application for the service provider 136 to maintain operational information about the facility (e.g., reservations, users in line, incentives, user information). The FMA 132 may be connected to a facility server screen (FSS) 140. FSS 140 is an application configured to provide information to a user interface for the OPS manager 138 regarding a particular aspect of the facility (e.g., food quantities in a restaurant). The FSS 140 communicates with the FMA 132 to update each user interface accordingly. According to an embodiment, real time updates are available between facility system 128 and information storage system 102, allowing user 134, service provider 136, and OPS manager 138 to mutually access updated information available from information storage system 102.

The FMA 132 receives information about the user's requests from the information storage system 102. However, the information does not include any PII of the user 134. In some instances, a first name or other identifier (e.g., username) may be used, but the FMA 132 does not receive contact information or a full name of the user 134. If the service provider 136 desires to contact the user 134, a message is transmitted to the information storage system 102 via the FMA 132 for delivery on the communication platform 120.

In operation, the application server 114 may receive, via the FCA 130 executed on a computing device of the user 134 during a session on a channel on a communication platform 120, a user request from the user 134. For example, the user 134 may utilize social media in order to initiate a chat session with the application server 114 via the FCA 130. The user may initiate the session (by initiating a chat session on a third-party website and selecting the application server 114 as a recipient of the chat session) and the application server 114 may display the FCA 130 on the chat session on the third-party website. The FCA 130 may be configured to receive user requests from the user 134 (and other users not shown) via the user 134 computing device and transmit the user requests to at least one of the bot 116 of the application server 114 or the FMA 132. The user requests may include PII associated with the users (e.g., age, sex, credit card number, and the like). The FCA 130 may transmit the user request to the application server 114 via the bot 116 or the bot connector 118. In some embodiments, the FCA 130 may also filter the sensitive PII and may not transmit the PII to the FMA 132. The application server 114 may display the FCA 130 on a communication platform 120 displayed on a computing device associated with the user 134 (e.g., the application server 114 may display the FCA 130 on the chat session used by the user 134). The FCA 130 may then use the communication platform 120 to transmit the user request to various computing devices described above. The communication platform 120 may be configured to receive, from the FCA 130, the user requests; the communication platform 120 may also be configured to route the user request to the bot 116 of the application server 114 via the bot connector 118. The communication platform 120 may also be configured to receive, from the facility system 128, a message corresponding to the user request. The facility system 128 may also comprise a user interface associated with the FMA 132, which is configured to be displayed on a facility computing device, wherein the user interface is configured to receive data associated with the facility. The application server 114 may allow the user 134 to communicate (via the FCA 130, bot 116, and/or bot connector 118) to various computing devices within the facility system 128. The application server 114 may also update a plurality of data records within the data store 106 configured to store the plurality of data records containing information about a plurality of facilities (including the facility system 128) and data records containing information about a plurality of users (including user 134 and other user not shown here), wherein the information about the plurality of users comprises personally identifiable information, wherein the server updates the plurality of data records based on the user request and the message corresponding to the user request.

In a non-limiting example, the user 134 may initiate a chat session with the application server 114 on a third party website (e.g., social media website) in order to reserve a table at a restaurant. Upon receiving an indication that a chat session has been initiated, the application server 114 may cause the FCA 130 to be displayed within the chat session on the social media website. The user 134 may type the user request and request to reserve a table at a particular restaurant. The user 134 may also indicate the number of patrons, a reservation time, and may include PII (e.g., credit card number in order to confirm the reservation). The FCA 130 may receive the data inputted by the user 134 and may utilize the communication platform 120 to transmit the user request to the bot connector 118, which is configured to transmit the user request to the bot 116 (e.g., the bot connector 118 is configured to route messages between the bot 116 of the application server 114 and the computing device of the user 134 via the channel of the communication platform 120 (e.g., different channels such as channels 122-126)).

The application server 114 may also (via the bot 116) transmit the user request to FMA 132. The FMA 132 is configured to receive and transmit information about the user 134 and the user request, from the FCA 130 via the bot 116 during the session, without any personally identifiable information of that user, update information about the facility in the data store 106, and receive and transmit information about the user 134 and the user request from the FCA 130 without communicating via the bot 116 during the session. For example, FMA 132 may receive the user request (e.g., table reservation for the user 134) and may display the user request on various computing devices associated with the facility system 128. An operator (associated with any of the computing devices of the facility system 128) may receive the user request on a user interface (e.g., FSS 140 and/or FMA 132) and may respond to the user request with a message corresponding to the user request (e.g., confirming the reservations based on the time and the number of patrons). The corresponding message then is received by the application server 114 (via FMA 132) and may transmit the message (via bot 116 and bot connector 118) to the FCA 130 (e.g., to be displayed to the user). The application server 114 may then update the data records within the data store 106 to reflect the reservation of the user 134. In some embodiments, the application server may facilitate a direct chat session between the user 134 and an operator at the facility system 128. For example, if the user 134 needs special accommodations, the user 134 may input the special accommodations into the chat session and the FCA 130 may transmit that special request directly to FMA 132 or FSS 140.

Figure 2:
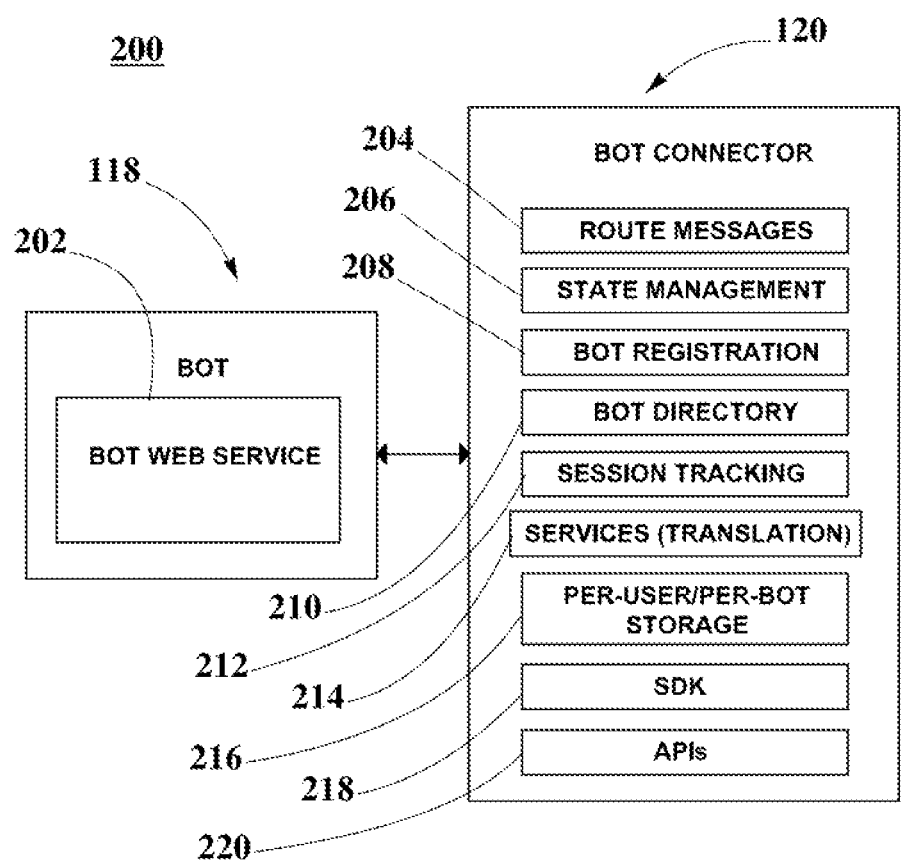
FIG. 2 illustrates a bot diagram that may be employed by ICSA, according to an embodiment.

FIG. 2 illustrates a bot architecture 200 that may be employed by ICSA 100, according to an embodiment. In FIG. 2, a bot 116 is connected to a bot connector 118.

Bot 116 is executed by an application server 114 of an information storage system 102. A bot web service 202 included in the bot 116 connects to the cloud system 108 of FIG. 1 and enables communication with ICSA 100.

Bot 116 may act as an automated agent that communicates and interacts with a user through the communication platform 120. Bot 116 simulates an intelligent conversation with a human user 134, and may be designed to provide an automated customer support for said user 134.

Bot connector 118 may include several functions, such as routing messages 204 from user 134 to bot 116 and vice-versa; performing state management 206, meaning to manage and preserve the state of one or more user interface controls of the bot 116, such as text fields, buttons, object/data, and others; performing bot registration 208 and managing a bot directory 210, allowing developers to release different bots 116 to users; performing session tracking 212, which is a way to track and maintain state of a user 134, more specifically recognizing a particular user 134 when said user 134 sends a request to bot 116, and which may be done through techniques known in the art, such as using cookies, hidden form field, URL rewriting, and HttpSession, amongst others; performing services 214 such as translation of text from a user 134 for clear comprehension of requests to bot 116, and translating bot 116 replies to user 134 back to original language employed by said user 134; enabling per-user and per-bot storage 216, referring to data storage per particular user 134 related to a corresponding bot 116; enabling access to a software development kit (SDK) 218, allowing for development of new bots 116 and modification of existing bots 116; and allowing access to application programming interfaces (APIs 220) serving as interfaces for bots 116 and communication platform 120.

Figure 3:
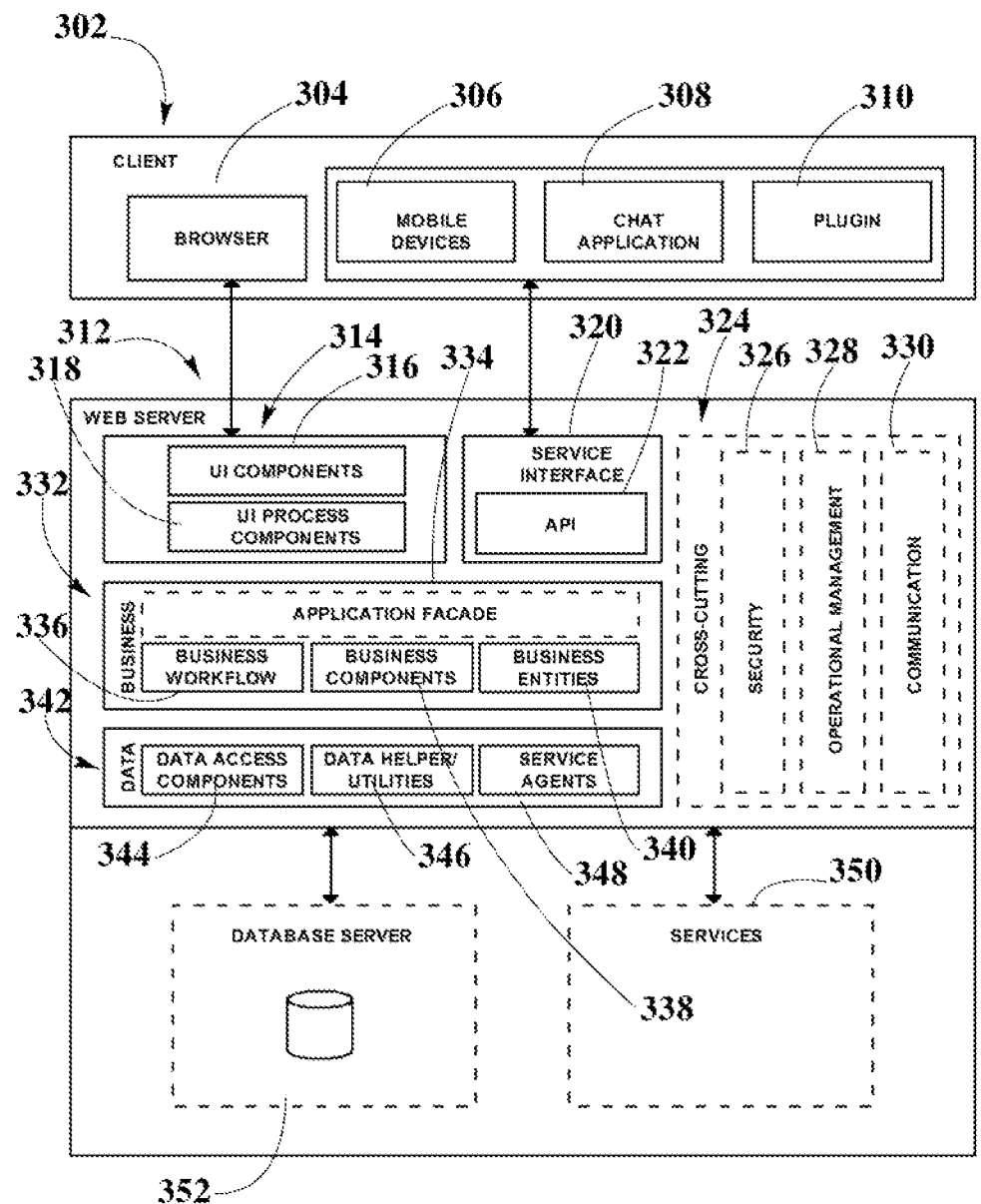
FIG. 3 illustrates an architectural diagram of a facility customer application (FCA) that may be employed by ICSA, according to an embodiment.

FIG. 3 illustrates an architectural diagram of an FCA that may be employed by ICSA, according to an embodiment.

In FIG. 3, FCA includes a client 302 with a web browser 304, mobile devices 306, chat application 308, and a website plugin 310. Client 302 is connected to a web server 312 and is served presentation/user interface (UI) layer 314 elements including UI components 316 and UI process components 318. Presentation/UI layer 314 may employ a caching system to load certain UI assets into memcache to reduce load times.

The web server 312 is configured to serve content to users using Hypertext Transfer Protocol (HTTP) and communicatively connects to the application servers 114 of ICSA in FIG. 1. In particular, the web servers 312 display FCA content to users through the client 302, while the application servers 114 are in charge of executing the logic, i.e., the interaction between the user and the content displayed. The application servers 114 may be configured to deal with different protocols, including but not limited to HTTP.

The presentation/UI layer 314 is configured to enable user interaction. The UI components 316 include code to perform functions such as configuring the visual appearance of controls, accepting and validating user input, and acquiring and rendering data. The UI process components 318 perform presentation/UI layer tasks that are not directly related to user interactions. For example, UI process components 318 may enable the flow of control between forms in the presentation/UI layer 314 and coordinate background tasks such as state management and handling of concurrent user activities. Users are able to see and interact with UI components 316, whereas UI process components 318 are typically not visible to users but perform vital supportive role to UI components 316.

Mobile devices 306, chat application 308, website plugin 310, and external resources, if existent, may communicate with a service interface 320 which includes APIs 322. APIs 322 be used to perform standard CRUD operations for ICSA.

Web server 312 may additionally include cross cutting functions 324, which refer to functions that affect different layers and tiers within FCA. Cross cutting functions 324 may include, amongst others, security 326, operational management 328, and communication 330. Security 326 may protect data by using user tokens and sessions. Operational management 328 may include performing business analytics, such as user count. Communication 330 is configured to allow interaction between components across layers and tiers of FCA.

A business function layer 332 may be used to hold business logic and rules, and may include application facade 334, business workflow 336, business components 338, and business entities 340.

A data layer 342 may include data access components 344, data helpers/utilities 346, and service agents 348. Service agents 348 may be utilized to retrieve various services per user. Data layer 342 may additionally hold data per application and communicate with services feature 350 to sync data between database server 352, which may include two databases: one associated with FCA and one associated with the CMA.

Figure 4:
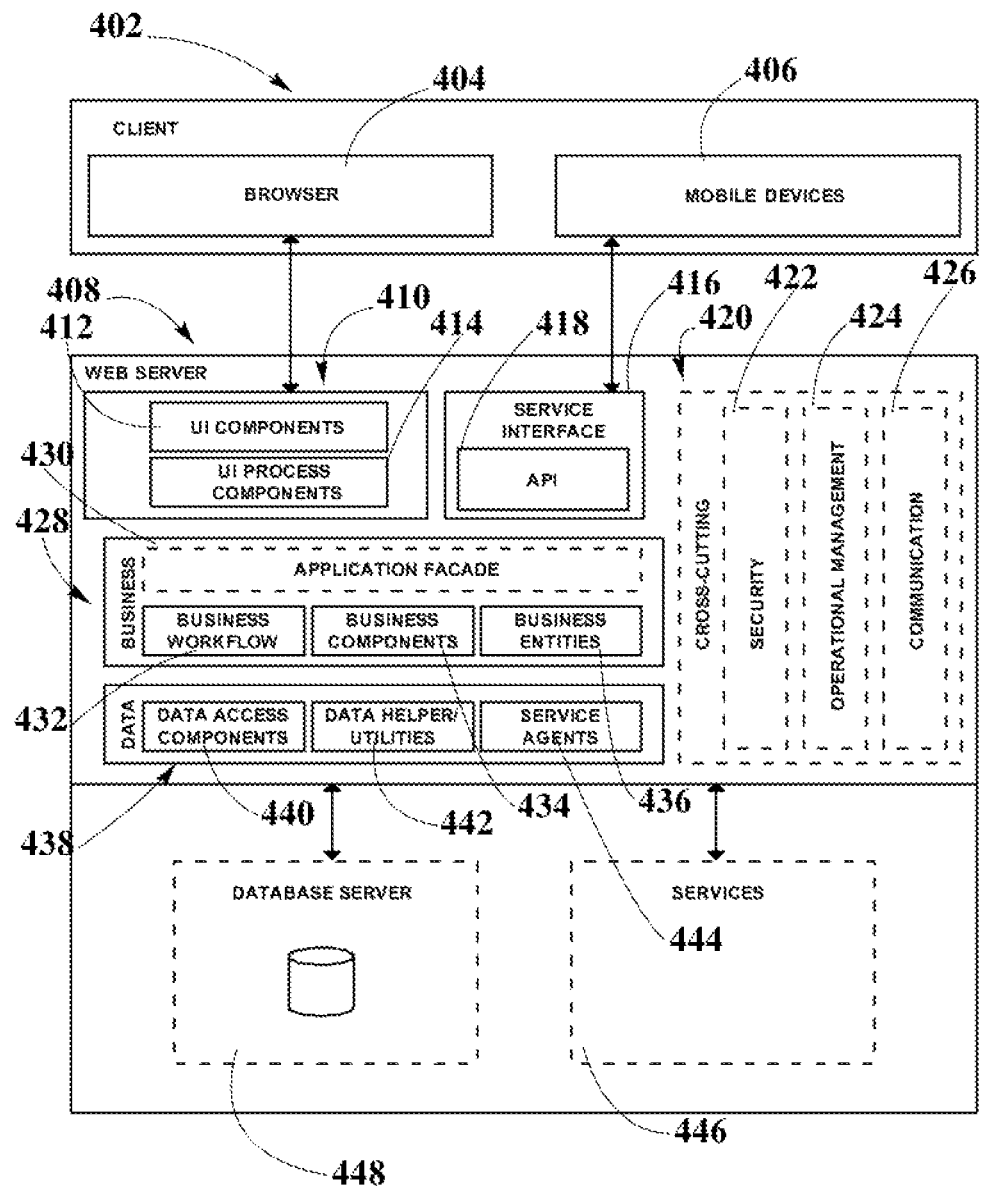
FIG. 4 illustrates an architectural diagram of a facility management application (FMA) that may be employed by ICSA, according to an embodiment.

FIG. 4 illustrates an architectural diagram of FMA that may be employed by ICSA, according to an embodiment. FMA may be employed to update and provide real time information about facility operations.

In FIG. 4, the FMA includes a client 402 with a web browser 404 and mobile devices 406. Client 402 is connected to a web server 408 and is served presentation/UI layer 410 elements including UI components 412 and UI process components 414. Presentation/UI layer 410 may employ a caching system to load certain UI assets into memcache to reduce load times.

The web server 408 is configured to serve content to users using Hypertext Transfer Protocol (HTTP) and communicatively connects to the application servers 114 of ICSA in FIG. 1. In particular, the web servers 408 display FMA content to FMA users (i.e., OPS managers and/or service providers) through the client 302, while the application servers 114 are in charge of executing the logic, i.e., the interaction between FMA users and the content displayed. The application servers 114 may be configured to deal with different protocols, including but not limited to HTTP.

The presentation/UI layer 410 is configured to enable user interaction. The UI components 412 include code to perform functions such as configuring the visual appearance of controls, accepting and validating user input, and acquiring and rendering data. The UI process components 414 perform presentation/UI layer tasks that are not directly related to user interactions. For example, UI process components 414 may enable the flow of control between forms in the presentation/UI layer 410 and coordinate background tasks such as state management and handling of concurrent user activities. FMA users are able to see and interact with UI components 412, whereas UI process components 414 are typically not visible to FMA users but perform vital supportive role to UI components 412.

Mobile devices 406 and external resources, if existent, may communicate with a service interface 416 which includes APIs 418. APIs 418 be used to perform standard CRUD operations for ICSA.

Web server 408 may additionally include cross cutting functions 420, which refer to functions that affect different layers and tiers within FCA. Cross cutting functions 420 may include, amongst others, security 422, operational management 424, and communication 426. Security 422 may protect data by using user tokens and sessions. Operational management 424 may include performing business analytics, such as user count. Communication 426 is configured to allow interaction between components across layers and tiers of FCA.

A business function layer 428 may be used to hold business logic and rules, and may include application facade 430, business workflow 432, business components 434, and business entities 436.

A data layer 438 may include data access components 440, data helpers/utilities 442, and service agents 444. Service agents 444 may be utilized to retrieve various services per user. Data layer 438 may additionally hold data per application and communicate with services feature 446 to sync data between database server 448.

Figure 5:
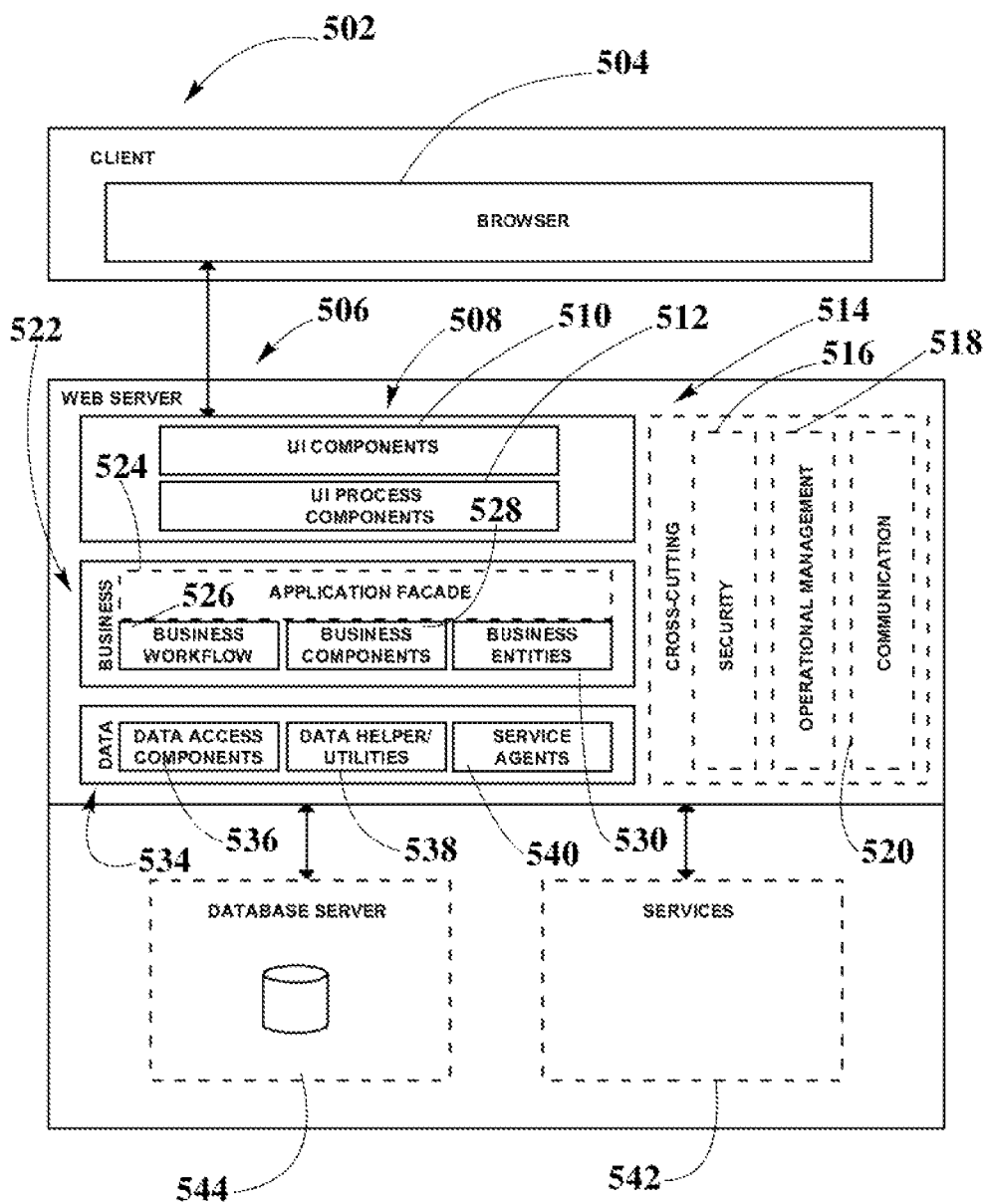
FIG. 5 illustrates an architectural diagram of a content management application (CMA) that may be employed by ICSA, according to an embodiment.

FIG. 5 illustrates an architectural diagram of CMA that may be employed by ICSA, according to an embodiment. CMA may manage the full life cycle of content components, from inception through removal. CMA may create, maintain, and remove content components to and from a repository. The management process is sequential in nature and may be accomplished employing a workflow.

In FIG. 5, CMA includes a client 502 with a web browser 504. Client 502 is connected to a web server 506 and is served presentation/UI layer 508 elements including UI components 510 and UI process components 512. Presentation/UI layer 508 may employ a caching system to load certain UI assets into memcache to reduce load times.

The web server 506 is configured to serve content to users using Hypertext Transfer Protocol (HTTP) and communicatively connects to the application servers 114 of ICSA in FIG. 1. In particular, the web server 506 displays CMA content to CMA users (i.e., ICSA manager) through the client 502, while the application servers 114 are in charge of executing the logic, i.e., the interaction between CMA users and the content displayed. The application servers 114 may be configured to deal with different protocols, including but not limited to HTTP.

The presentation/UI layer 508 is configured to enable user interaction. The UI components 510 include code to perform functions such as configuring the visual appearance of controls, accepting and validating user input, and acquiring and rendering data. The UI process components 512 perform presentation/UI layer tasks that are not directly related to user interactions. For example, UI process components 512 may enable the flow of control between forms in the presentation/UI layer 508 and coordinate background tasks such as state management and handling of concurrent user activities. CMA users are able to see and interact with UI components 510, whereas UI process components 512 are typically not visible to CMA users but perform vital supportive role to UI components 510.

Web server 506 may additionally include cross cutting functions 514 such as security 516, operational management 518, and communication 520. Security 516 may protect data by using user tokens and sessions. Operational management 518 may be used to maintain factors relevant to business operation including business analytics, such as user count. Communication 520 is configured to allow interaction between components across layers and tiers of CMA.

A business function layer 522 may be used to hold business logic and rules, and may include application facade 524, business workflow 526, business components 528, and business entities 530.

A data layer 534 may include data access components 536, data helpers/utilities 538, and service agents 540. Service agents 540 may be utilized to retrieve various services per user. Data layer 534 may additionally hold data per application and communicate with services feature 542 to sync data between database server 544.

Figure 6:
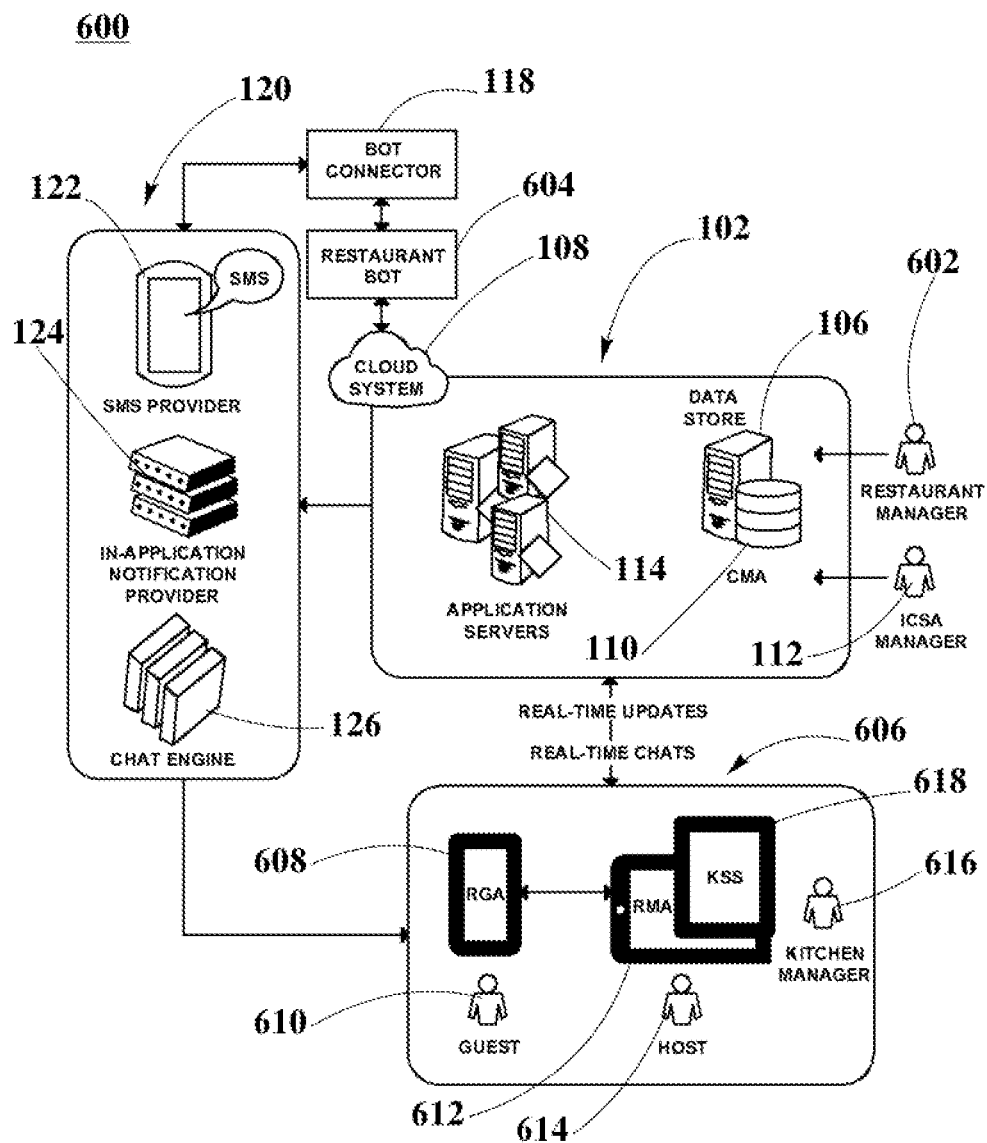
FIG. 6 illustrates an architectural diagram of ICSA applied in restaurant customer support, according to an embodiment.

FIG. 6 illustrates an architectural diagram of ICSA applied for an automated customer support in a restaurant 600, according to an embodiment.

For the automated customer support in a restaurant 600, an information storage system 102 may be a host entity that is configured to communicatively couple a plurality of restaurants, a plurality of customers, and a communication platform. The information storage system 102 is configured to allow a restaurant manager 602 to maintain restaurant information in a data store 106. Information input by the restaurant manager 602 in the data store may include restaurant location, restaurant menu with food types and prices, and restaurant wait times, amongst others. In one example, the data store 106 may be configured as at least one solid state drive that stores the most frequently used data and a hard disk drive that stores less frequently used data. The data store 106 may store information about each restaurant in a plurality of data records, whereby inputs from the restaurant manager 602 will update the data records accordingly. The information storage system 102 may also store information in a cloud system 108, which may include or be separate from the data store 106. Information in the data store 106 includes customer information and contains PII of those customer, but also associates the customers with an identifier such that information about the customers can be distributed to other components of the ICSA without sharing the PII.

The data store 106 is connected to a CMA 110. The CMA 110 is a user interface configured to allow editing, adding, and deleting content from the data records in the data store 106. An ICSA manager 112 may access the CMA 110 to edit information in the data store 106. Additionally, the CMA 110 may be configured to allow information from the data records of the data store 106 to be transmitted to application servers 114.

The application servers 114 are depicted as a plurality of servers but may be configured as a single server. The application servers 114 store and execute a restaurant bot 604 that is communicatively coupled to a bot connector 118 executing on a communication platform 120.

The communication platform 120 is communicatively coupled to the information storage system 102. The communication platform 120 may execute an application configured to allow a text-based or voice-based communication via a computing device to another user, e.g., a chat application, a text message application native to an operating system, or a text message application hosted by a social networking platform. For example, the communication platform 120 may include an SMS provider 122, an in-application notification provider 124, and/or a chat engine 126.

Communication platform 120 and the information storage system 102 are communicatively coupled to a restaurant system 606 for each restaurant. The restaurant system 606 may include a restaurant-guest application (RGA) 608 for each guest 610 and a restaurant management application (RMA) 612 for each of the plurality of restaurants. The application servers 114 host the application executed by the RGA 608 and RMA 612.

The RGA 608 is an application that has a user interface configured for a computing device of the user to input requests for the restaurant (e.g., food order, getting on a line, viewing menu, etc.). Most requests from RGA 608 will be communicated via communication platform 120. The application server 114 receives information from the communication platform 120 and transmits appropriate information to the RMA 612. In some instances, the RGA 608 may communicate directly with the RMA 612. For example, the guest 610 may interact with RGA 608 to conduct a real-time chat with a host 614 or a kitchen manager 616 of RMA 612.

RMA 612 is an application for the host 614 to maintain operational information about the restaurant (e.g., reservations, users in line, incentives, user information). The RMA 612 may be connected to a kitchen server screen (KSS) 618. KSS 618 is an application configured to provide information to a user interface for the kitchen manager 616 regarding a particular aspect of the restaurant (e.g., food quantities). The KSS 618 communicates with the RMA 612 to update each user interface accordingly. According to an embodiment, real time updates are available between restaurant system 606 and information storage system 102, allowing guest 610, host 614, and kitchen manager 616 to mutually access updated information available from information storage system 102.

The RMA 612 receives information about the guest's requests from the information storage system 102. However, the information does not include any PII of the guest 610. In some instances, a first name or other identifier (e.g., username) may be used, but the RMA 612 does not receive contact information or a full name of the guest 610. If the host 614 desires to contact the guest 610, a message is transmitted to the information storage system 102 via the RMA 612 for delivery on the communication platform 120.

Figure 7:
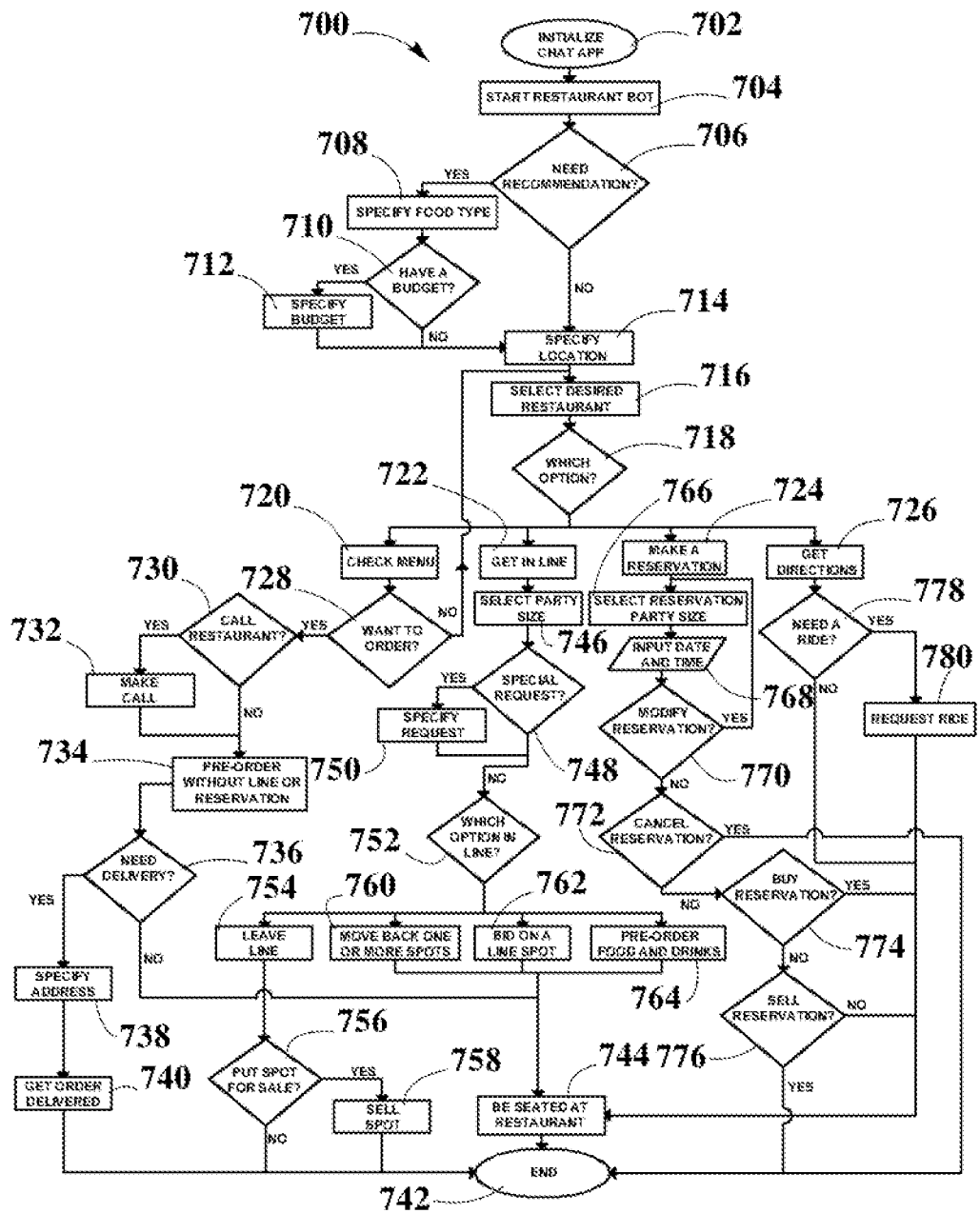
FIG. 7 illustrates a process flowchart of an automated customer support applied for a restaurant, according to an embodiment.

FIG. 7 illustrates a process flowchart of an automated customer support 700 for a restaurant. Automated customer support 700 may employ an ICSA 100 architecture such as the one shown in FIG. 6.

In the process below, the restaurant bot uses a chat application, included in the communication system of FIG. 6, as a user interface enabling interaction with guests. The restaurant bot is executed by the application servers of the information storage system, and may act as an automated agent for a plurality of restaurants that have information included in the data store. When a guest inputs any request (e.g., food preferences, budget, preferred restaurants, etc.), the restaurant bot receives these inputs and transfers the inputs to the CMA. The CMA processes the requests in order to provide the restaurant bot with appropriate content based on the information and services available at the data store. The restaurant bot then retrieves the appropriate content from the CMA and delivers the content to the guests. All inputs from guests are also saved in the data store and serve to update the data store accordingly.

Once a user has selected a specific restaurant and sends requests to the restaurant (e.g., food order, payment, getting in line, etc.) the restaurant bot sends the requests directly to the RGA. The RGA processes the requests in order to provide the restaurant bot with appropriate content based on the information and services available at the specific restaurant. The RGA obtains the information and services available at the current restaurant from the data store. Additionally, the RGA may communicate all user requests to the RMA and KSS to enable hosts and kitchen managers to act upon the user requests.

During certain steps, the method for automated customer support 700 may alternate between going from providing options for a specific restaurant, or generic options involving more than one of the plurality of restaurants included in the data store. In these moments, the communication between the restaurant bot may respectively alternate between CMA and RGA, and vice versa.

In FIG. 7, a guest first initializes a chat application 702, which may display different bot applications including the restaurant bot. Then, the guest starts the restaurant bot 704, which prompts the application servers to execute the restaurant bot for the guest. The restaurant bot may then propose providing a restaurant recommendation 706. If the guest wants to receive a recommendation, then the restaurant bot provides an option to the guest to specify a desired food type 708. Subsequently, the restaurant bot provides the customer with an option to specify a budget 710. If the guest does have a budget, the guest may follow by specifying a budget 712. After specifying a budget 712, or if the guest does not have a specific budget, the guest may continue by specifying a desired location 714.

According to an embodiment, suitable methods for specifying a desired food type 708 may include selecting from suggested options that may be based on previous user experiences. According to another embodiment, other suitable methods for specifying a desired food type 708 may include inputting a desired food type.

According to an embodiment, a suitable option for specifying a desired location 714 may include sharing current location of a guest as an input for restaurant location search. According to another embodiment, a suitable option for specifying a desired location 714 may include searching for a restaurant in a given location, for which guests may be able to input zip code, city, and state of the desired restaurants, amongst others. According to yet another embodiment, guests may specify a desired location 714 by selecting from options based on previous dining experiences.

When the guest has selected a specific food type, budget, and location, the CMA conducts a search against database records in the data store for restaurants that meet the criteria. Results for the search may be displayed in the chat application in a graphical carousel format. According to some embodiments, results for the search may be related to restaurants that have been visited in the past by the guest. The guests may be able to swipe through the different graphics until discovering a restaurant appealing to them. Restaurant results may be displayed by closest proximity to the location of the guest. If there is a wait time that has been provided by a restaurant, a restaurant result photo may display the wait time for the restaurant.

Continuing with FIG. 7, guests may then select a desired restaurant 716 from suggested options. Once a restaurant has been selected, the guest may select amongst several options 718. Namely, the guest may first get an option to check a restaurant menu 720, get in line 722 in a restaurant, make a reservation 724, and get directions 726.

After a guest checks a restaurant menu 720, the guest may be given an option to make an order 728. In case the guest does not want to make an order, the guest may go back to select a desired restaurant 716. Otherwise, the restaurant bot gives the guest an option to call a restaurant 730. If the guest desires to call the restaurant, the guest may proceed by making a call 732 to the restaurant for pre-ordering without making a line or reservation 734. Alternatively, if supported by a restaurant, the restaurant bot may provide the guest with an option to pre-order without making a line or reservation 734. When pre-ordering without making a line or reservation 734, a restaurant menu is again evoked as well as the ability to select items, order, and pay. The words "line" and "queue" may both indicate a data record (within a database) indicating a time value associated with various user requests and chats sessions. A "Line" or a "queue" indicates the order of the user requests received from various users (e.g., ranked based on the time received). The words "line" and "queue" may be interchangeably used throughout the present disclosure. A person skilled in the art will appreciate that these words are referring to the same concept.

The restaurant bot may provide an option for delivery 736, in which case the guest may proceed by specifying address 738 for order delivery. When specifying address 738, the guest may simply confirm from a suggested location displayed by in the chat application, or may as well input a full address for order delivery. Afterwards, the guest may get an order delivered 740 to a specified location to finally end the process 742. In case the guest does not desire a delivery, the guest may physically go to the restaurant location for being seated at restaurant 744 when space is available and get the order to eat in, finally ending the process 742. Alternatively, the guest may as well go to the restaurant and pick up the order to go (not shown).

Continuing with options after selecting a desired restaurant 716, if the guest decides to get in line 722, the restaurant bot may prompt the guest to select a party size 746 and then may ask whether the guest has special requests 748. After specifying special requests 750, or if there are not any special requests, the guest may continue with further options in line 752. Special requests may include outdoor dining and bar seating, amongst others.

According to some embodiments, once a guest gets in line 722, whenever the guest moves up one or more spots in line, the chat application of the restaurant bot may display a new chat window with the new place in line. Additionally, once the guest gets in line 722, the restaurant bot may send a notification that a restaurant frequented in the past may have started a waiting line, displaying current distance to said restaurant. The restaurant bot may provide guests with an option to manually get in line 722 in the displayed restaurants, and may provide also an option to disable these types of notifications for specific or all restaurants. Furthermore, the restaurant bot may provide guests with an option to share through a suitable platform (e.g. social media) the fact that they have gotten in line. If a restaurant has a social coupon set up in the data store, the coupon may also be displayed in a post, giving guests access to the restaurant bot.

Continuing with process, options in line 752 may include leaving the line 754, which may display an option for putting a line spot for sale 756 or to just directly end the process 742. Leaving the line 754 may remove guests from a restaurant wait line, removing guests from the wait list in the chat application and sending an alert to the RGA, RMA, and KSS.

Selecting an option for putting a line spot for sale 756 may prompt guests to enter a price for the spot in line or enter a best offer tag. After adding the price for sale or best offer tag, a currency symbol (e.g., "$") may appear next to the place of a guest in line, which may also be visible for other guests. This currency symbol may only be seen by other eligible guests, eligible being defined as guests with the same party size as the party that is for sale. If a guest intending to sell finds an eligible guest intending to buy and both agree on a transaction price, the guest intending to sell the line spot may sell a spot 758 and end the process 742. Guests may also select an option allowing them to remove their spot for sale (not shown), which removes guests from a restaurant wait line, sending an alert to removing users from the wait list in chat application and sending an alert to the RGA, RMA, and KSS. Finally, a guest selling a line spot may also get the option to swap the spot with guests buying the line spot.

Continuing with options in line 752, a guest may as well move back one or more spots in line 760. Selecting to move back one or more spots in line 760 sends an alert asking for permission of other guests to move back one or more spots in line 760; subsequently, if the restaurant approves such request, then the guest may be allowed to move back one or more spots in line 760 and this information is rendered in both chat application and restaurant RMA.

Continuing with options in line 752, if there is a spot for sale and guest party size matches the party size of the spot for sale, guests may also get an option to bid on a line spot 762. In this case, a guest may view a currency symbol in the chat application. Selecting the currency symbol may evoke a chat box with the line spot price prompting guests to make an offer for said line spot. Making an offer for a line spot sends a buy offer to a guest intending to sell the line spot. If a guest intending to sell the spot accepts the offer, a transaction takes place, giving the buyer of the line spot the new line spot in the restaurant. The seller of the line spot may have an option to swap spots (not shown) with the buyer or may simply leave the line and end the process 742.

Continuing with options in line 752, if a guest is within a certain spot of being ready to be seated or at a certain distance from a restaurant, the guest may pre-order food and drinks 764, given that said option is supported by the restaurant. When selecting pre-order food and drinks 764, the restaurant menu is evoked as well as the ability to select items, order, and pay. Food and drinks may only be prepared once a guest is at a certain distance from the restaurant. Additionally, if supported by a restaurant, the restaurant bot may send updates about the order, which may include: food being cooked, drinks being on the way, and appetizers being on the way, amongst others.

Once a guest has opted for moving back one or more spots in line 760, bidding on a line spot 762, or pre-ordering food and drinks 764, the guest may proceed by being seated at a restaurant 744 and finally by ending the process 742.

Another option available after selecting a desired restaurant 716, if the restaurant permits the option, may include making a reservation 724. Selecting an option for making a reservation 724 may prompt a guest to select a reservation party size 766 and then to input a date and time 768 of reservation. If the reservation is available for that party size, date, and time, guests are notified by the restaurant bot that the reservations is confirmed and a reservation confirmation may also be sent to the restaurant. If that reservation is not available, guests may be prompted by the restaurant bot to select from numerous options sorted by time and day closest to the requested time and day.

The restaurant bot may also provide guests with an option to modify a reservation 770, in which case the process may go back to make a reservation 724. The restaurant bot provides guests with a list of the reservations, if more than one, made until that moment, as well as an option to modify them. If a guest does not modify a reservation 770, the restaurant bot may provide guests with an option to cancel a reservation 772. If the guest proceeds to cancel a reservation 772, the restaurant bot provides the guest with options on the different reservations that the guests may have made (if more than one). Selecting any of the reservations sends a cancel request to a corresponding restaurant.

If a guest does not cancel a reservation 772, the restaurant bot may provide guests with other options such as buying one or more reservations 774. If the guest buys one or more reservations 774, the guest may be able to select from different options and prices from sellers of said reservations. The guest may also get an option to sell one or more reservations 776. Guests may be able to select a predetermined price for a reservation or select an option for best offer, as well as being able to upload a reservation confirmation. Consequently, other guests interested in buying one or more reservations 774 may be able to make an offer and sellers may be able to accept the offer and complete the transaction. If a guest buys one or more reservations 774, the guest may proceed by being seated at restaurant 744 when suitable time comes. If a guest decides to sell one or more reservations 776, then the guest may be removed from the restaurant reservation list and may end the process 742.

According to an embodiment, another option available after selecting a desired restaurant 716 may be to get directions 726 for the restaurant. Accordingly, getting directions 726 may generate a suitable map showing current location of a guest and directions to the restaurant. Guests may have an option for requesting a ride 778 to the selected restaurant. Guests may request a ride 780 by selecting different ride application interfaces, which may connect the guests directly to the ride applications. Suitable maps when getting directions 726 may include Google Maps™ Suitable ride applications may include Uber™ and Lyft™, amongst others.

According to an embodiment, at any step from automated customer support 700 there may be an option for human support engagement (not shown), which may enable real time chats between guests and hosts, and/or kitchen managers.

The terminology used herein is for the purpose of describing particular embodiments only and is not intended to be limiting of the invention. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

The terms "or" and "and/or" as used herein are to be interpreted as inclusive or meaning any one or any combination. Therefore, "A, B or C" or "A, B and/or C" mean any of the following: A; B; C; A and B; A and C; B and C; A, B and C." An exception to this definition will occur only when a combination of elements, functions, steps or acts are in some way inherently mutually exclusive. While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

What we claim is:

1. A method comprising:
    receiving, by a server via a bat connector, an electronic request from a user device, a user operating the user device submitting the electronic request during a bat communication session with the bat connector, the electronic request comprising personally identifiable information of the user, a reservation request associated with a facility, and reservation request attributes;
    upon dynamically populating a graphical user interface corresponding to the user request on a facility computing device of the facility, receiving, by the server, an input from the facility computing device, wherein the server does not display any personally identifiable information on the facility computing device;
    transmitting, by the server via the bat connector, a message corresponding to the received input from the facility computing device to the user device;
    updating, by the server, a plurality of data records within a data store containing information about a plurality of facilities and data records containing information about a plurality of users, wherein the server updates the plurality of data records based on the electronic request and the input received from the facility computing device;
    modifying, by the server, a queue of electronic requests each time an electronic request is received from a user device and a corresponding input is received from the facility computing device; and
    displaying, by the server, on the user device, at least one of a menu and an estimated wait line for the facility.

2. The method of claim 1, wherein the bot communication session is a chat session on a social media website.

3. The method of claim 1, wherein the bot communication session is established by an application controlled by the server and executing on the user device.

4. The method of claim 1, wherein the server establishes a communication session between the facility computing device and the user device.

5. The method of 1, wherein the plurality of data records are arranged based on a time associated with a plurality of users submitting electronic requests.

6. The method of claim 1, wherein the server revises an order of the queue.

7. The method of claim 1, wherein the server populates the graphical user interface with at least one request attribute.

8. The method of claim 1, wherein the user request further comprises a location of the facility.

9. A computer system comprising:
   a user device operated by a user and configured to execute an electronic communication session;
   a bot connector configured to establish the electronic communication session, receive an electronic request inputted by the user, and transmit the electronic request to a server;
   a facility computing device configured to display a graphical user interface displaying information associated with the user request; and
   a server in communication with the user device, bot connector, and facility computing device, the server configured to:
      receive, via the bat connector, the electronic request from the user device, the user operating the user device submitting the electronic request during a bot communication session with the bot connector, the electronic request comprising personally identifiable information of the user, a reservation request associated with a facility, and reservation request attributes;
      upon dynamically populating the graphical user interface with information corresponding to the user request on the facility computing device of the facility, receive an input from the facility computing device, wherein the server does not display any personally identifiable information on the facility computing device;
      transmit, via the bot connector, a message corresponding to the received input from the facility computing device to the user device;
      update a plurality of data records within a data store containing information about a plurality of facilities and data records containing information about a plurality of users, wherein the server updates the plurality of data records based on the electronic request and the input received from the facility computing device;
      revise a queue of electronic requests each time an electronic request is received from a user device and a corresponding input is received from the facility computing device; and
      display, on the user device, at least one of a menu and an estimated wait line for the facility.

10. The computer system of claim 9, wherein the bot communication session is a chat session on a social media website.

11. The computer system of claim 9, wherein the bot communication session is established by an application controlled by the server and executing on the user device.

12. The computer system of claim 9, wherein the server establishes a communication session between the facility computing device and the user device.

13. The computer system of 9, wherein the plurality of data records are arranged based on a time associated with a plurality of users submitting electronic requests.

14. The computer system of claim 9, wherein the server revises an order of the queue.

15. The computer system of claim 9, wherein the server populates the graphical user interface with at least one request attribute.

16. The computer system of claim 9, wherein the user request further comprises a location of the facility.

* * * * *